United States Patent
Kurath-Grollmann (10) Patent No.: US 8,793,965 B2
(45) Date of Patent: Aug. 5, 2014

(54) CONSTRUCTION ELEMENTS FOR BUILDINGS

(75) Inventor: Josef Peter Kurath-Grollmann, Winterthur (CH)

(73) Assignee: Zürcher Hochschule für Angewandte Wissenschaften (ZHAW), Winterthur (CH)

( * ) Notice: Subject to any disclaimer, the term of this patent is extended or adjusted under 35 U.S.C. 154(b) by 0 days.

(21) Appl. No.: 13/129,458

(22) PCT Filed: Nov. 18, 2008

(86) PCT No.: PCT/EP2008/065770
§ 371 (c)(1),
(2), (4) Date: Jul. 29, 2011

(87) PCT Pub. No.: WO2010/057522
PCT Pub. Date: May 27, 2010

(65) Prior Publication Data
US 2011/0271623 A1 Nov. 10, 2011

(51) Int. Cl.
*E04C 2/34* (2006.01)
(52) U.S. Cl.
USPC ........ 52/790.1; 52/843; 52/783.1; 52/745.19; 428/188
(58) Field of Classification Search
USPC ............. 52/783.1, 790.1, 657, 843, 846, 834, 52/742.1, 745.19; 428/120, 167, 178, 188; 108/51.3, 52.1
See application file for complete search history.

(56) References Cited

U.S. PATENT DOCUMENTS

| | | | | | |
|---|---|---|---|---|---|
| 1,643,577 | A | * | 9/1927 | Dornier | 52/843 |
| 2,348,703 | A | * | 5/1944 | Weir et al. | 428/121 |
| 2,576,715 | A | * | 11/1951 | Farrell | 108/51.3 |
| 3,276,177 | A | * | 10/1966 | Keller | 52/783.1 |
| 3,871,149 | A | * | 3/1975 | Georgii | 52/404.1 |
| 3,918,289 | A | * | 11/1975 | Oswald et al. | 72/439 |
| 4,741,089 | A | | 5/1988 | Oberg | |

(Continued)

FOREIGN PATENT DOCUMENTS

| EP | 0 892 123 A | 1/1999 |
|---|---|---|
| FR | 2 192 231 A | 7/1972 |
| WO | WO 2005/038160 A | 4/2005 |

OTHER PUBLICATIONS

International Search Report and International Preliminary Report on Patentability and Written Opinion; International Application No. PCT/EP2008/065770; International Filing Date: Nov. 18, 2008.

*Primary Examiner* — Robert Canfield
*Assistant Examiner* — Babajide Demuren
(74) *Attorney, Agent, or Firm* — Antonelli, Terry, Stout & Kraus, LLP.

(57) ABSTRACT

A semi-finished product (1a) has a tubular sleeve element (4) which extends along a longitudinal axis (A) and has a substantially rectangular cross-section and at least a first (3a) and at least a second (3b) strut element, wherein the first strut element (3a) extends from a first edge of the tubular sleeve to the second edge which lies opposite it with respect to the longitudinal axis, and the second strut element (3b) extends along the other diagonal between the associated edges. The strut elements (3a, 3b) are advantageously designed and arranged such that they absorb compressive forces but not tensile forces. The product can be fabricated completely from a fiber-reinforced plastic and may be integrated in construction elements and surface elements.

20 Claims, 7 Drawing Sheets

(56) References Cited

U.S. PATENT DOCUMENTS

| | | | |
|---|---|---|---|
| 5,206,067 A * | 4/1993 | Bonzo | 428/119 |
| 5,294,472 A * | 3/1994 | Arnold et al. | 428/120 |
| 5,536,461 A * | 7/1996 | King et al. | 264/209.3 |
| 5,587,115 A * | 12/1996 | Allen | 264/1.24 |
| 5,608,999 A * | 3/1997 | McNamara | 52/275 |
| 5,654,518 A * | 8/1997 | Dobbs | 89/36.02 |
| 5,658,644 A * | 8/1997 | Ho et al. | 428/188 |
| 5,768,851 A * | 6/1998 | Nagaoka | 52/790.1 |
| 5,850,722 A * | 12/1998 | Yasui | 52/793.11 |
| 5,972,475 A * | 10/1999 | Beekman | 428/167 |
| 6,195,953 B1 | 3/2001 | Gitter et al. | |
| 6,671,440 B2 * | 12/2003 | Morris | 385/100 |
| 7,051,489 B1 * | 5/2006 | Swiszcz et al. | 52/783.18 |
| 7,481,030 B2 * | 1/2009 | Grunst | 52/394 |
| 7,641,954 B2 * | 1/2010 | Rouanet et al. | 428/76 |
| 2002/0043045 A1 * | 4/2002 | Marino Del Din | 52/783.1 |
| 2003/0096096 A1 * | 5/2003 | Jo et al. | 428/297.4 |
| 2003/0159397 A1 * | 8/2003 | Birnbaum | 52/733.2 |
| 2004/0035068 A1 * | 2/2004 | Eliyahu et al. | 52/271 |
| 2005/0138891 A1 * | 6/2005 | Wool et al. | 52/782.1 |

* cited by examiner

CONSTRUCTION ELEMENTS FOR BUILDINGS

RELATED APPLICATION

This application is a U.S. national phase application under 35 U.S.C. 371 of International Application PCT/EP2008/065770 filed Nov. 18, 2008.

BACKGROUND OF THE INVENTION

The invention relates to an improved semi-finished product having a tubular sleeve element which extends along a longitudinal axis and at least a first and at least a second strut element arranged inside the sleeve element, to a construction element and a surface element in which the semi-finished product is integrated, and to a related method of producing a surface element. The invention relates particularly to load-bearing construction elements.

DESCRIPTION OF THE PRIOR ART

Compact heavy structural members made from steel, concrete steel, wood or aluminum are today widely used for load-bearing structural members in building construction. These solid structural members usually have a small bearing capacity to dead weight ratio. The bearing capacity to dead weight ratio is typically approximately 3:1 to 1:2.

It is desirable to have construction elements with a particularly high bearing capacity to dead weight ratio. This would, for example, make it possible to bridge relatively large spans with a relatively low dead weight of the construction elements. The load on a structure situated beneath would also be reduced.

SUMMARY OF THE INVENTION

It is an object of the invention to provide construction elements of the type mentioned at the beginning which have a particularly high bearing capacity to dead weight ratio. Other objects are to provide methods for producing such construction elements, as well as semi-finished products which can be used in the fabrication of such construction elements.

Another object of the invention is to provide construction elements which make it possible to bridge relatively large spans with a relatively low dead weight.

Another object of the invention is to provide particularly stable but nevertheless light construction elements.

Another object of the invention is to provide construction elements which can be used in multiple ways.

Another object of the invention is to provide methods for producing construction elements which comprise a particularly small number of process steps.

Another object of the invention is to provide semi-finished products which enable the construction elements to be fabricated easily.

The construction elements can rather be elongated construction elements or rather be flat construction elements, also called surface elements.

At least one of these objects is solved by devices and methods having the features of the independent patent claims.

The semi-finished product has a tubular sleeve element which extends along a longitudinal axis and at least a first and at least a second strut element arranged inside the sleeve element. The first strut element extends from a first point to a second point, and the second strut element extends from a third point to a fourth point, wherein the projections of said points in a plane perpendicular to the longitudinal axis form four corner points of a rectangle, wherein the projections of the first and the second points form corner points of the rectangle which are opposite each other relative to the longitudinal axis.

The projections of the third and the fourth points thus also form corner points of the rectangle which are opposite each other relative to the longitudinal axis.

Such a semi-finished product makes it possible to create a construction element according to the invention and in particular a surface element according to the invention in just a few steps. Also, such a semi-finished product can be easily prefabricated.

The semi-finished products can also be incorporated, for example slid or pushed, into pre-existing hollow-bodied structures.

In one embodiment, the semi-finished product is a semi-finished product for forming a construction element.

In one embodiment, the sleeve element is film-like. Such sleeve elements are very thin and can be created easily and can be applied to the strut elements.

In one embodiment, the sleeve element encases the strut element arrangement.

In one embodiment, the strut elements are retained by the sleeve element. The sleeve element can also be referred to as a retaining element. The strut elements can be retained relative to each other by the sleeve element.

In one embodiment, the semi-finished product has at least two first and two second strut elements each.

In one embodiment, the semi-finished product has a plurality of first and second strut elements. In one embodiment, the relative position of the strut elements to one another is at least roughly determined by the sleeve element; in particular, the relative position of a first to a second strut element, which together form a pair of strut elements, can be substantially determined by the sleeve element. It is thereby made considerably easier to create construction elements and in particular surface elements.

In one embodiment, the sleeve element forms a closed tube, possibly up to one or both of its tube ends.

In one embodiment, the strut elements are arranged entirely inside the sleeve element, if need be with the exception of the end regions of the sleeve element.

It can thus be prevented that the strut elements in further process steps come into contact with further structural members of the construction or surface element in order to create construction and in particular surface elements, as a result of which the attachment of strut elements to these further structural members, such as by bonding, is prevented.

In one embodiment, the outer contour of the sleeve element which can be seen by looking along the longitudinal axis is formed substantially by the already mentioned rectangle with said points as corner points. The diagonals of the rectangle run through the projections of the first and second points and through the projections of the third and fourth points.

In one embodiment, both the first and the second strut element extend along both one diagonal and along the other diagonal.

In one embodiment, the strut elements are designed in such a way and arranged inside the sleeve element in such a way that compressive forces can be exerted on the strut elements by the sleeve element.

In one embodiment, the strut elements are designed in such a way and arranged inside the sleeve element in such a way that essentially no tensile forces can be exerted on the strut elements by the sleeve element.

These properties in terms of the compressive and tensile forces are obtained especially when the semi-finished product is part of a construction element created therewith.

In one embodiment, the first and the second point lie in one and the same plane perpendicular to the longitudinal axis, and the third and the fourth point lie in one and the same plane perpendicular to the longitudinal axis.

In one embodiment, the strut elements are each oriented substantially perpendicular to the longitudinal axis.

In one embodiment, the sleeve element is substantially a film.

In one embodiment, the sleeve element is formed at least substantially by a wound film.

In one embodiment, the film is shrunk onto the strut elements. A simple manner of production is thereby achieved.

In one embodiment, the film for forming the tube is bonded or welded to itself. A simple manner of production is thereby achieved.

In one embodiment, the film is bonded or welded to the strut elements. It is thereby obtained that the strut elements are retained properly in their position by the sleeve element.

In one embodiment, the bonding or welding of the film to the strut elements is only temporary. This means that the bonding or welding is preserved only until a construction element formed with the semi-finished product is being used.

In one embodiment, the film is bonded or welded to the first strut element and to the second strut element in each case only at one of said points. Consequently, the strut elements are not connected to the sleeve element at the respective other point, so that it is ensured that no tensile forces are absorbed.

In one embodiment, the sleeve element has, in at least one surface formed by the sleeve element and which contains said points, a corrugation which runs substantially parallel to the longitudinal axis. The use of such a corrugation can ensure that, in a method for manufacturing a surface element, the sleeve element does not move too far away from the strut elements at said points. It is thereby effected that the position of the strut elements inside the surface element is substantially fixed and remains so. Furthermore, the strut elements can absorb pressure and hence contribute to the stability even when small compressive forces occur (which are exerted on a construction element which contains the semi-finished product).

In one embodiment, the corrugation runs substantially centrally between said two points.

In one embodiment, the sleeve element has such corrugations in two surfaces formed by the sleeve element and lying opposite each other.

In one embodiment, the sleeve element has such corrugations in all four surfaces formed by the sleeve element.

In one embodiment, the corrugation has a substantially V-shaped cross-section.

In one embodiment, the sleeve element is pretensioned by the strut elements.

In one embodiment, the first strut element and the second strut element are designed such that they engage with each other.

In one embodiment, the first strut element and the second strut element are designed such that they engage with each other in such a way that each strut element impedes or prevents the respective other strut element from bending, in particular the respective other strut element from bending perpendicularly to the longitudinal axis.

Thereby the overall stability can be greatly increased and/or the weight of the strut elements can be reduced.

In one embodiment, the first strut element and the second strut element each have a groove, the first and the second strut elements engaging in each other at the grooves.

In one embodiment, the grooves are arranged substantially centrally between the first and the second point, or between the third and the fourth point. In this way, bending of the strut elements is counteracted at the point where the bending would generally be greatest in amplitude.

In one embodiment, the strut elements are substantially fabricated
from ceramic,
from concrete, or
from a plastic, in particular a plastic composite, for example a fiber-reinforced plastic.

Fibers such as, for example, glass fibers or carbon, aramid or basalt fibers, or alternatively natural fibers, can be used here. Both thermosetting plastics and thermoplastics are suitable as plastics, in particular, for example, epoxide, polyester, polyurethane, PMMA, vinylester and polyamide.

In one embodiment, the semi-finished product has multiple strut elements which are spaced apart from one another in the direction of the longitudinal axis, for example evenly spaced apart.

In one embodiment, the semi-finished product has multiple strut elements which are arranged one behind the other in the direction of the longitudinal axis and may overlap one another.

In one embodiment, identical parts are used as the first and second strut elements. This facilitates the production and handling of the strut elements.

The construction element has a semi-finished product of the above-described type, wherein the sleeve element forms a hollow body which extends along the longitudinal axis and has a rectangular cross-section, possibly with rounded corners, or is arranged inside such a hollow body of the construction element. On the one hand, the sleeve element can thus form the hollow body of the construction element, in which case it is preferably at least predominantly fabricated from a fiber-reinforced plastic. On the other hand, the construction element can have said hollow body in addition to the sleeve element, wherein the sleeve element is then arranged inside the hollow body and is preferably fabricated at least predominantly from a film-like material.

A stabilization of the hollow body is achieved by providing the strut elements inside the hollow body so that the latter can have a relatively thin-walled design and as a whole a stable but very light construction element results. The hollow body and thus the construction element are stiffened by the strut elements.

In this way, bearing capacity to dead weight ratios of approximately 5:1 to 10:1 can be obtained.

In one embodiment, the semi-finished product is integrally formed on the inner edges of the hollow body. Compressive forces can thereby be transmitted particularly well from the hollow body to the strut elements.

In one embodiment, the strut elements are form-fitted to the hollow body.

In one embodiment, the strut elements are force-fitted to the hollow body.

The connection between hollow bodies and strut elements can be almost spot-like, substantially linear or alternatively flat.

In one embodiment, the strut elements are not fastened to the hollow body and do not adhere to the hollow body.

In one embodiment, the sleeve element ensures that the strut elements do not adhere and are not fastened to the hollow body.

In one embodiment, the first strut element extends substantially along one diagonal of the hollow body and the second strut element along the other diagonal.

In one embodiment, the strut elements extend along both diagonals in each case. Such strut elements can be particularly stable.

In one embodiment, at least a first and at least a second strut element are arranged over a length which corresponds to up to 30 times the length of the diagonals and in particular corresponds to at least once the length of the diagonals. A high degree of stability can thereby be obtained, in particular with a low weight.

In one embodiment, strut elements arranged adjacently along the longitudinal axis extend respectively along one and the other diagonal. A high degree of stability can thereby be obtained.

In one embodiment, the surfaces of the hollow body which extend parallel to the longitudinal axis are completely closed.

In one embodiment, the hollow body is substantially fabricated from a fiber-reinforced plastic, in particular from a glass fiber-reinforced plastic, or from another plastic composite. The same materials are suitable for the plastic and the fibers as were listed above for the strut elements.

In one embodiment, the fibers are arranged substantially in the manner of paper fibers.

In one embodiment, the majority of the fibers, in particular at least 80% of the fibers, form an angle of 45°±25°, in particular 45°±15°, with the longitudinal axis.

In one embodiment, the majority of the fibers, in particular at least 80% of the fibers, are oriented within ±25°, in particular 15°, parallel to the longitudinal axis.

In one embodiment, the strut elements are designed in such a way and arranged inside the sleeve element in such a way that compressive forces can be exerted by the hollow body on the strut elements.

In one embodiment, the strut elements are designed in such a way and arranged inside the sleeve element in such a way that substantially no tensile forces can be exerted by the hollow body on the strut elements.

In one embodiment, the construction element is a load-bearing construction element, a supporting member.

In one embodiment, the construction element is a structural member, in particular for constructing buildings.

In one embodiment, the construction elements consist only of the hollow body and the strut elements and possibly at least one retaining element, for example the sleeve element. This means that they otherwise contain nothing other than a gas (generally air). The construction elements are thus particularly light.

In one embodiment, an additional material is arranged inside the hollow body, in particular one which contributes to increased thermal insulation and/or increased sound insulation and/or increased fire resistance. The hollow body is in particular filled with this additional material. The construction elements in particular consist only of the hollow body, the strut elements and said additional material, as well as possibly at least one retaining element, for example the sleeve element, wherein they otherwise contain nothing other than a gas (generally air).

In one embodiment, the hollow body has a substantially bar-like, beam-like or board-like external form.

In one embodiment, the extent of the hollow body along the longitudinal axis is at least 5 times or 10 times or 20 times as great as it is perpendicularly thereto.

In one embodiment, the hollow body has a rectangular, in particular square, cross-section with rounded or unrounded corners.

In one embodiment, the diagonal of the cross-section of the hollow body is at least 5 cm or 10 cm and no more than 6 m or 4 m or 1 m.

In one embodiment, the wall thickness of the hollow body is at least 0.5 mm or 1 mm and no more than 20 mm or 10 mm.

In one embodiment, the strut elements extend inside the hollow body respectively from a point of a first cross-section of the hollow body to a point of the second cross-section of the hollow body which lies opposite it with respect to the longitudinal axis.

In one embodiment, the first cross-section and the second cross-section are identical, purely in terms of fabricating accuracy of course.

The embodiments of the semi-finished product described above also result in corresponding construction elements with analogous effects and advantages.

In one embodiment, a construction element is produced by a semi-finished product being introduced into a hollow body.

A hollow body can, for example, be created by making a hollow body billet in a continuous production process and dividing it up to make the hollow bodies.

In one embodiment, the hollow bodies, the sleeve element and possibly the strut elements are transparent. This is possible in a particularly easy fashion by the use of plastics or plastic composites.

The use of plastics or plastic composites for the hollow body and/or the sleeve element and/or the strut elements makes it possible to easily produce the construction elements in different colors.

The surface element according to the invention has multiple construction elements according to the invention arranged next to one another and fastened relative to one another, in particular connected to one another or fastened to one another.

The surface element is also a construction element, in particular a load-bearing structural member, a supporting member. In order to differentiate this rather flat construction element from the above-described construction element, it is referred to as a surface element.

In one embodiment, the surface element is a structural member, in particular for buildings.

In a typical embodiment, the surface element is plate- or disk-shaped.

In one embodiment, the surface element is a floor element.

In one embodiment, the surface element is a ceiling element.

In one embodiment, the surface element is a roof element.

In one embodiment, the surface element is a ceiling or floor element.

In one embodiment of the surface element, the construction elements are arranged substantially parallel to one another.

In one embodiment, a filling material is arranged between the construction elements.

In one embodiment, the surface element has a cover element arranged above or below the construction elements.

In one embodiment, a filling material is arranged between the cover element and the construction elements.

In one embodiment, the cover element is a surface which can be walked on.

In one embodiment, the cover element serves a static loading purpose.

In one embodiment, the cover element serves a visual purpose.

In one embodiment, the cover element extends over all construction elements.

In one embodiment, the cover element for forming the surface element is applied in the manner of a layer.

In one embodiment, the cover element for forming the surface element is applied in the manner of a plate.

In one embodiment, the cover element for forming the surface element is applied as a whole over the whole surface.

In one embodiment, the cover element for forming the surface element is applied sequentially in parts, in particular in the form of parts which complement one another to cover the whole surface, for example in the form of stripes.

In one embodiment, the cover element takes the form of a single layer.

In one embodiment, the cover element takes the form of multiple layers.

In one embodiment, the cover element is made at least partially substantially of a plastic, for example a plastic composite, in particular a fiber-reinforced plastic, in particular a glass fiber-reinforced plastic.

In one embodiment, the cover element is made at least partially substantially of wood.

In one embodiment, the cover element is made at least partially substantially of a mortar, for example a cement-based or plastic-based mortar.

In one embodiment, the surface element has a further cover element, the construction elements being arranged between the two cover elements.

In one embodiment, the two cover elements are oriented substantially parallel to each other.

In one embodiment, the cover element or elements has or have fastening means, for example toothed elements, which are for example oriented substantially perpendicularly to the plane in which the cover element (or cover elements) extend.

In one embodiment with two cover elements, the cover elements have fastening means which extend from one cover element to the other cover element. Such connecting elements allow particularly stable surface elements.

In one embodiment with two cover elements, the surface element has two construction elements which are arranged spaced apart from each other vertically with respect to the longitudinal axis, without a further construction element being arranged between them. Such surface elements can be readily used as support elements, in particular as bending beams, in particular when they have precisely two construction elements.

The other above-described embodiments of the semi-finished product and the construction element result in corresponding surface elements with analogous effects and advantages.

The method for producing a surface element is characterized in that at least one semi-finished product, by means of which four edges of a cuboid running parallel to the longitudinal axis are formed and which has at least a first and at least a second strut element, the first strut element extending from a first point on a first edge of the cuboid to a second point on a second edge of the cuboid and the second strut element extending from a third point on a third edge of the cuboid to a fourth point on a fourth edge of the cuboid, is surrounded with a fibrous material and a plurality of such semi-finished products surrounded with fibrous material are arranged next to one another, and in that a filling material is introduced into the fibrous material and hardened.

Surface elements according to the invention can be produced using such a method.

Using such a method, it is possible to dispense with the prior (separate) fabrication of construction elements. Such a method also allows the creation of construction elements and the connecting of the construction elements to be performed together, and thus substantially as part of the same process. In other words, the construction elements are formed and connected to one another in the same process.

The said edges of the cuboid (first to fourth edge) are not identical with one another.

In one embodiment of the method, the semi-finished product has at least one retaining element, the strut elements being connected to one another by the at least one retaining element.

In one embodiment of the method, the semi-finished products used are semi-finished products of the type described at the beginning. In this case, the at least one retaining element thus has a sleeve element of the type mentioned at the beginning.

In one embodiment of the method, the at least one retaining element has a plurality of connecting elements by means of which sections of the edges of the cuboid are formed, in particular sections which are arranged respectively between two sections in which the edges of the cuboid are formed in each case by a strut element.

In one embodiment of the method, the at least one retaining element has a plurality of connecting elements arranged substantially at the edges of the cuboid, in particular bar-like connecting elements and/or connecting elements oriented substantially parallel to the longitudinal axis. In each case, two strut elements arranged adjacently are connected to each other by such connecting elements, or in each case, two first strut elements arranged adjacently, or in each case, two second strut elements arranged adjacently are connected to each other. The strut elements can thus be retained in their position relative to each other.

In one embodiment of the method, a plurality of semi-finished products surrounded by fibrous material are created by a semi-finished product surrounded by fibrous material being divided up, typically substantially perpendicularly to the longitudinal axis. When one particularly long semi-finished product is surrounded by fibrous material instead of a plurality of shorter semi-finished products, fibrous material needs to be applied less often, which shortens the production process.

In one embodiment of the method, fibrous material is wrapped around the semi-finished products.

In one embodiment, the fibrous material is formed substantially by fibrous mats, by prepreg material, in particular by prepregs. The same sorts of fibers can be used as were mentioned above as fibers for strut elements.

In one embodiment, the filling material is a resin. The same sorts of plastics can be used as were mentioned above as plastics for strut elements.

In one embodiment of the method, a reduced pressure is generated on the fibrous material in order to introduce the filling material into the fibrous material. Pockets of air or other gases are thereby minimized and the filling material compacted so that a high degree of stability is achieved.

In one embodiment of the method, at least one section of the semi-finished products surrounded by fibrous material is arranged between two boundaries and the reduced pressure is generated between the boundaries, whereas a higher pressure prevails beyond at least one of the boundaries and inside the semi-finished products. A high fiber density and thus a high degree of stability are obtained thereby.

In one embodiment of the method, the boundaries are arranged above and below the semi-finished products surrounded by the fibrous material.

In one embodiment of the method, the higher pressure is ambient pressure.

In one embodiment of the method, the boundaries are flat and in particular plane in form.

In one embodiment of the method, one of the boundaries or both boundaries is or are formed at least partially by the cover element or elements.

In one embodiment of the method, at least a portion of the semi-finished products surrounded by fibrous material is introduced into an evacuatable container.

On the other hand, in order to produce a surface element, it is also possible to first fabricate construction elements and then fasten these to one another, for example by bonding, welding or laminating, in particular by laminating them together or one on top of the other, or by mechanically interconnecting them, for example by form-fitting or by means of fastening means. The fastening of the construction elements to one another, for example by bonding, can be effected using spots or stripes or alternatively over the whole surface.

Cover elements can be fastened to the construction elements by, for example, bonding or welding, in particular by welding the cover element onto the construction elements, or by laminating, in particular by laminating the cover element onto the construction elements, or by mechanically interconnecting them, for example by form-fitting or by means of fastening means.

The invention in principle also comprises construction elements and surface elements having features which correspond to the features of the described methods.

Further embodiments and advantages will become apparent from the dependent patent claims and the figures.

SHORT DESCRIPTION OF THE DRAWINGS

The subject of the invention is explained below in more detail with reference to exemplary embodiments and the attached drawings, in which.

The reference numerals used in the drawings and their meanings are collected and listed in the list of reference numerals. Parts which are not essential for understanding the invention have partially not been shown. The exemplary embodiments described represent examples of the subject of the invention and imply no limitation.

DESCRIPTION OF THE PREFERRED EMBODIMENTS OF THE INVENTION

Figure 1:
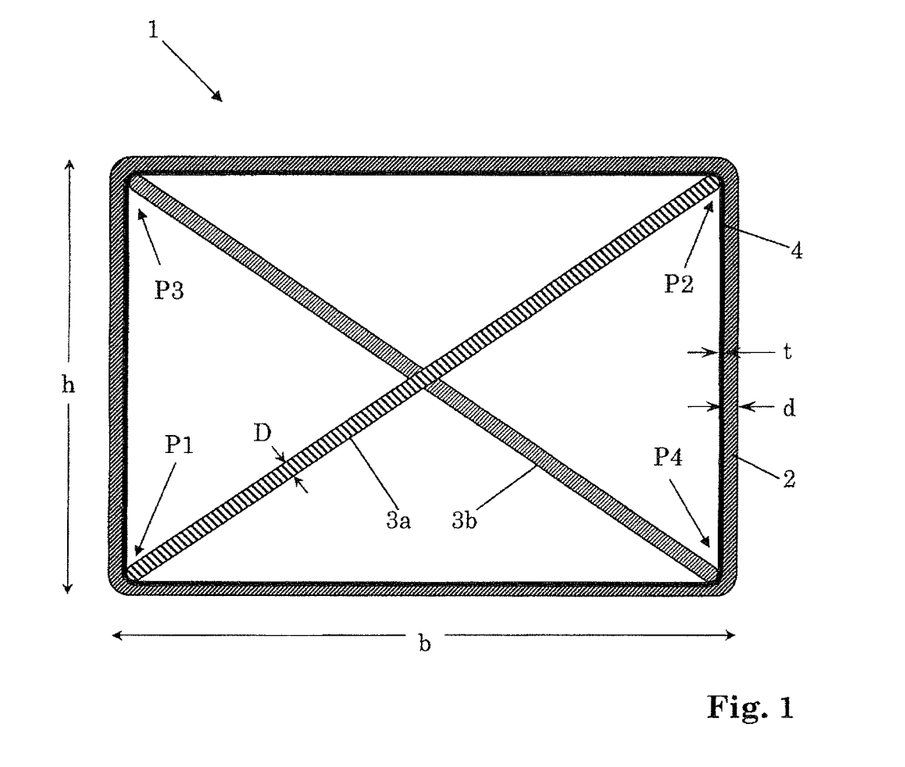
FIG. 1 shows a construction element in a cross-section perpendicular to the longitudinal axis.

FIG. 1 shows, in a cross section perpendicular to its longitudinal axis, a construction element 1 which can be used as a support member, for example for static purposes to construct buildings. The construction element 1 has: a hollow body 2 extending along said longitudinal axis, the longitudinal axis being perpendicular to the plane of the drawing, a plurality of strut elements 3a, 3b and a sleeve element 4. The hollow body 2 has a substantially tubular design and a rectangular cross-section, with rounded corners and a height h and width b which are each between 10 cm and cm and a wall thickness d between 2 mm and 8 mm. The length of the hollow body 2 can be chosen to be quite different, typically a few tens of centimeters to a few meters.

The strut elements 3a, 3b are arranged inside the sleeve element 4 arranged inside the hollow body 2 and each run along one of the diagonals of the cross-section of the hollow body and thus perpendicularly to the longitudinal axis. The strut element 3a runs from a point P1 to a point P2. It has a substantially bar-shaped design with a diameter D of 3 mm to 6 mm. At the points P1 and P2, the strut element 3a rests against the hollow body 2, the sleeve element 4 being arranged inbetween. In this way, and therefore because the strut element 3a is not fastened to the hollow body 2, the strut element 3a cannot absorb tensile forces and just compressive forces. At P1 and P2, the shape of the end of the strut element 3a is matched to the shape of the inner edge of the hollow body 2 (and hence to the geometry of the rounded edge of the hollow body 2). As a result of matching these shapes, a high degree of stability and good transmission of forces between the hollow body 2 and the strut element 3a are ensured. The strut element 3b is identical in design to the above-described strut element 3a and is arranged spaced apart from the latter. It runs from a point P3 to a point P4 along the other diagonal of the hollow body 2 in a parallel cross-section spaced apart along the longitudinal axis.

The sleeve element 4 has a tubular design and has a considerably thinner wall than the hollow body 2; its wall thickness is between 0.01 mm and 2 mm, typically between 0.1 mm and 1 mm. The sleeve element 4 is formed, for example, by a film which is shrunk onto an arrangement of the strut elements 3a, 3b in order to wrap the latter, whereby a semi-finished product is formed. The sleeve element 4 can also be created by a film being applied by being wound around.

The semi-finished product formed from the sleeve element 4 and strut elements 3a, 3b can be introduced into the hollow body 2, or the hollow body 2 can be formed with the aid of the semi-finished product. There is more on this below.

Figure 2:
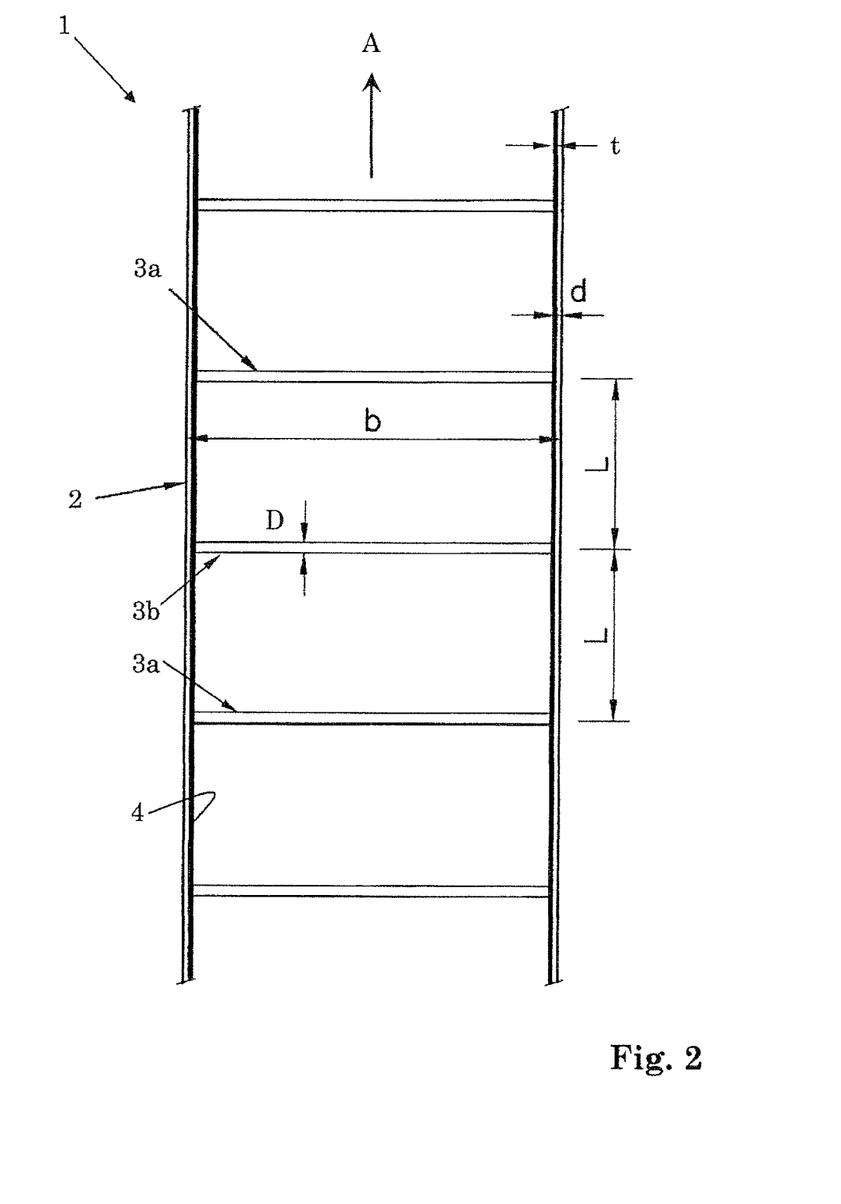
FIG. 2 shows the construction element according to FIG. 1 in a cross-section parallel to the longitudinal axis.

FIG. 2 shows the construction element 1 from FIG. 1 in a cross-section parallel to the longitudinal axis. The longitudinal axis is designated by the reference symbol A. The strut elements 3a and 3b are arranged so that they alternate periodically with each other, strut elements 3a and 3b respectively following strut elements 3b and 3a respectively, with a spacing L so that the strut elements extend in alternating fashion along one and the other diagonal. It is not necessary to provide the same spacing between adjacent strut elements. It is also not necessary for each strut element 3a to adjoin a strut element 3b; for example, a plurality of strut elements 3b can follow one or more strut elements 3a. Advantageously, at least one strut element 3a and at least one strut element 3b are arranged on a stretch, running along the longitudinal axis A, with a length between one and thirty times the length of the diagonal of the construction element 1.

Depending on how the sleeve element 4 is designed, it bears with substantially its complete surface against the inner surfaces of the hollow body 2 (cf FIGS. 1 and 2), or is partially spaced apart from the inner surfaces of the hollow body 2. The sleeve element 4 generally bears at least against the inner edges of the hollow body 2 and against partial surfaces, adjoining thereto, of the inner surfaces of the hollow body 2 or is only slightly spaced apart, at the places where it is provided that the strut elements 3a, 3b interact with the hollow body and hence in the region of the points P1, P2, P3, P4 (cf FIG. 1).

Both the hollow body 2 and the strut elements 3a, 3b are fabricated from a fiber-reinforced, in particular glass fiber-reinforced plastic, wherein wood, ceramic, glass or concrete or other materials with greater compressive strength can be used for the strut elements 3a, 3b. As a result of the strut elements 3a, 3b which each extend substantially transversely to the extent of the hollow body (and hence transversely to the longitudinal axis A), a very light construction element is created which can absorb a compressive load and can be used for many applications such as, for example, ceilings and floors, for bridges, scaffolds, event structures or platforms, and which has a high bearing capacity to dead weight ratio (>4:1).

It is possible to create flat construction elements from a plurality of these relatively elongated construction elements 1, as shown by way of example in FIGS. 1 and 2.

Figure 3:
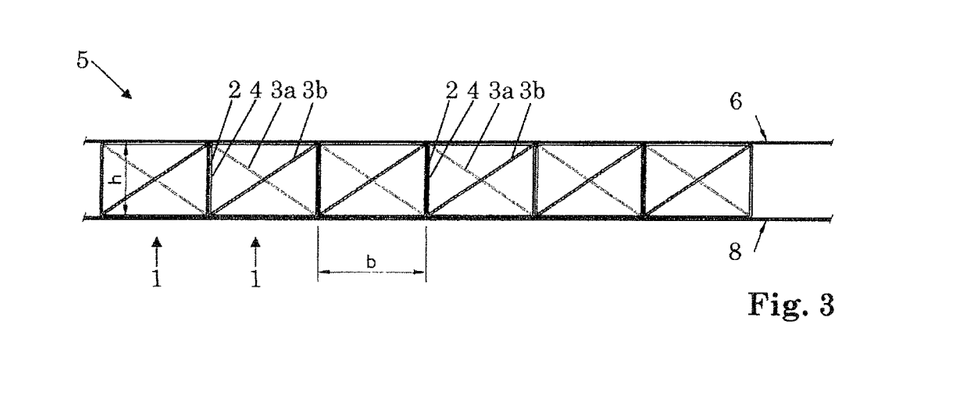
FIG. 3 shows a surface element in a cross-section perpendicular to the longitudinal axis of the construction elements.

FIG. 3 shows such a surface element 5 in a cross-section perpendicular to the longitudinal axis of the construction elements 1. A possible method for producing such a surface element 5 takes the following form:

The optionally prefabricated construction elements 1 are arranged parallel to one another and fastened to one another, for example by bonding. The construction elements 1 are produced in advance by, for example, producing a hollow body billet in a continuous process and dividing up said billet to create the hollow bodies 2 and introducing the likewise prefabricated semi-finished products (not designated as such in FIG. 3). A cover element 6 and 8 respectively is applied, for example bonded on or laminated on, above and below the flat structure thus created of construction elements 1. The cover elements 6, 8 can be used to improve the static properties of the surface element 5 and/or as cladding (for visual purposes). Such surface elements 5 can, for example, be used as floors or ceilings or floor elements or cover elements and have a surface area of, for example, approximately 1 m$^2$ and up to approximately 100 m$^2$.

The cover elements 6, 8 can have a single-layer or multi-layer (sandwich) design and are applied, for example, like plates, for example in the form of a plate made of a glass fiber-reinforced plastic.

It is possible also to provide a filling material in a surface element 5 in addition to construction elements 1 and cover elements 6 and/or 8. This can be provided between adjacent construction elements 1 and/or between the construction elements 1 and one or both cover elements 6, 8. No such filling material 7 is to be provided inside the sleeve elements 4.

Figure 4:
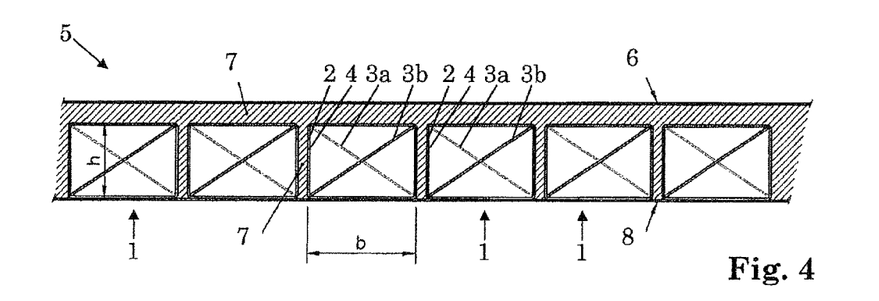
FIG. 4 shows a surface element with filling material in a cross-section perpendicular to the longitudinal axis of the construction elements.

FIG. 4 shows such a surface element 5 with a filling material 7 in a cross-section perpendicular to the longitudinal axis A of the construction elements 1. A compression wall can, for example, be formed by the filling material 7 (for example, in FIG. 4 between the construction elements 1 and the cover element 6). The filling material 7 can also absorb transverse forces between the construction elements 1.

Flowable hardenable materials are, for example, suitable as the filling material 7, such as, for example, mortar, concrete, synthetic resins, adhesives or other casting compounds. The filling material can also assume the function of fastening the construction elements 1 to one another and/or to cover elements 6, 8, where applicable.

Figure 5:
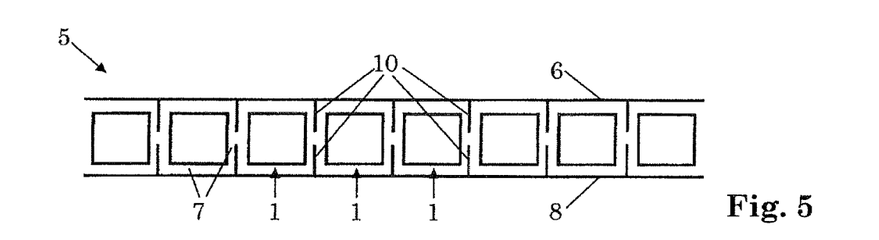
FIG. 5 shows diagrammatically a surface element with a cover element with toothed elements in a cross-section perpendicular to the longitudinal axis of the construction elements.

FIG. 5 shows diagrammatically (with strut elements and possible sleeve elements not illustrated) a cross-section perpendicular to the longitudinal axis of the construction elements 1 through a surface element 5 with cover elements 6, 8 which have fastening means in the form of toothed elements 10. Such toothed elements 10 project from the surface formed by the surface element 5 in the direction of the construction elements 1 or even, as shown in FIG. 5, between the construction elements 1. Their purpose is to improve (strengthen) the connection between the cover element 6, 8 and the filling material 7 so that the whole surface element 5 is more solid and stable.

Figure 6:
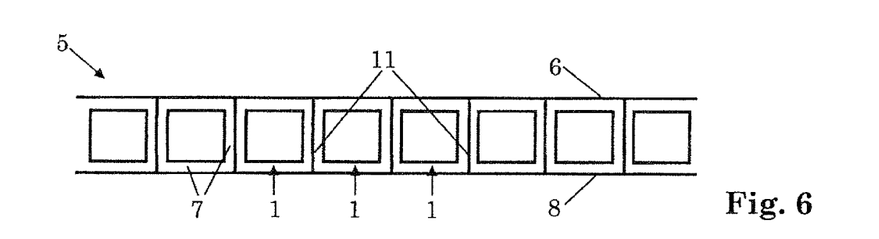
FIG. 6 shows diagrammatically a surface element with a cover element with connecting elements in a cross-section perpendicular to the longitudinal axis of the construction elements.

FIG. 6 shows, in the same way as FIG. 5, a cross-section perpendicular to the longitudinal axis of the construction elements 1 through a surface element 5 with cover elements 6, 8 which have fastening means in the form of connecting elements 11. The connecting elements 11 run through the filling material 7 and connect the two cover elements 6 and 8 to each other. The whole surface element is also thereby made more solid and stable.

Figure 7:
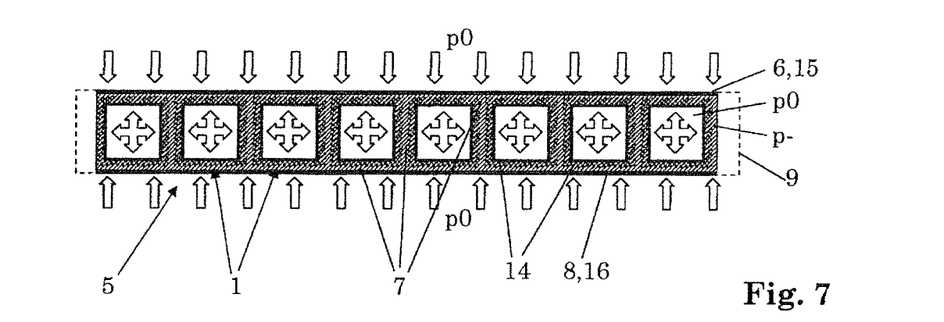
FIG. 7 shows an illustration of a method for producing a surface element.

FIG. 7 is an illustration of a specific method for producing a surface element 5, in the form of a cross-sectional sketch perpendicular to the longitudinal axis of the construction elements 1. First, semi-finished products (not shown in FIG. 7) are created by wrapping a sleeve element around a strut element arrangement or by providing other retaining elements, for example connecting elements (there is more about the retaining elements and connecting elements further below). Each of the semi-finished products is surrounded by a fibrous material 14 (shown in FIG. 7 by dots), for example is wrapped in a glass fiber mat or a prepreg.

A cover element 8 which serves as a boundary 16 is first introduced into an evacuatable container 9 which is only illustrated diagrammatically in FIG. 7. It is also possible to dispense with a cover element 8 and to use part of the container 9 as a boundary 16. The semi-finished products provided with the fibrous material 14 are arranged on the boundary 16 in any desired manner. When, as shown in FIG. 7, gaps should be provided between the semi-finished products, they are filled with a filling material 7. A boundary 15, which may be formed by a cover element 6, is then applied on top.

The container 9 is then evacuated (between the boundaries 15 and 16) in order, on the one hand, to achieve a good compacting of the fibrous material 14 and, on the other hand, to suck filling material 7 from a supply space into the container 9 and incorporate it into the fibrous material 14, as a result of which the fibrous material 14 is penetrated by filling material 7 if possible without air pockets. At least the sucked-in filling material 7 is then hardened. The hardening can take place, for example, without doing anything further or include heating of the filling material.

It should be pointed out that the filling material 7 sucked in during the vacuum process can be a different filling material from the filling material that may be optionally arranged between or above or below the semi-finished products.

Because the inside of the container 9 has a reduced pressure p− while there is an ambient pressure p0 outside the boundaries 15, 16, forces which are symbolized in FIG. 7 by open arrows are exerted and pull the sleeve elements outwards and press the boundaries 15, 16 together.

The construction elements 1 and the surface element 5 are created simultaneously using this method. It is not necessary to completely create the construction elements 1 in advance and this step can thus be omitted; the creation of the semi-finished products in advance is sufficient. The hollow bodies are formed at the same time as the surface element 5 and are also simultaneously connected to one another.

Surface elements created in this way generally have the property that sleeve elements and hollow bodies are connected to one another substantially over the whole surface.

FIGS. 8 to 24 return us to the construction elements 1 and the semi-finished products, or more precisely to different possibilities for designing the strut elements 3a, 3b.

Figure 8:
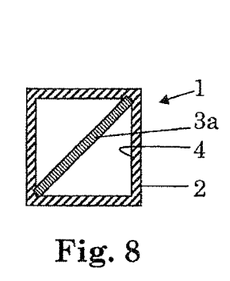
FIG. 8 shows diagrammatically a construction element with a bar- or board-like strut element in a cross-section perpendicular to the longitudinal axis.

FIG. 8 shows diagrammatically a bar- or board-shaped strut element 3a in a hollow body 2 in a cross-section perpendicular to the longitudinal axis of the hollow body 2, a sleeve element 4 which may be present not being shown. As explained in conjunction with FIGS. 1 and 2, such strut elements can be oriented alternately along one and the other diagonal of cross-sections of the hollow body 2 (a strut element 3b is not shown in FIG. 8). The cross-section of the strut element 3a can be substantially constant or vary over the length of the strut element 3a. If the strut element 3a is elongated in the direction of the longitudinal axis (perpendicular to the plane of the drawing) in order to obtain a rather board-like strut element 3a, a better transmission of compressive force from one edge of the hollow body to the opposite edge of the hollow body is achieved. Considerably greater flexural rigidity or bending strength can, for example, be achieved by increasing the elongation of the strut element 3a in a direction perpendicular to the longitudinal axis.

Figure 9:
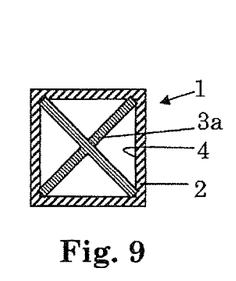
FIG. 9 shows diagrammatically a construction element with a cross-shaped strut element in a cross-section perpendicular to the longitudinal axis.

In the same way as FIG. 8, FIG. 9 shows diagrammatically a cross-shaped strut element 3a in a hollow body 2 in a cross-section perpendicular to the longitudinal axis of the hollow body 2. The strut element 3a extends along both diagonals of the cross-section of the hollow body 2; all four edges of the hollow body 2 interact with the same strut element 3a. The cross-section of the strut element 3a can be substantially constant or can vary. The strut element 3a from FIG. 9, and also the strut elements shown below in FIGS. 10, 11, 12, 21, 22, 23, 26, thus does not, like the above-described strut elements, extend from just one edge of the hollow body 2 to the edge of the hollow body 2 which lies on the opposite side with respect to the longitudinal axis, but also extends from another edge of the hollow body 2 to that edge of the hollow body 2 which lies opposite it along the other diagonal.

Figure 10:
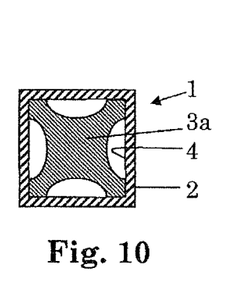
FIG. 10 shows diagrammatically a construction element with a disk-shaped strut element in a cross-section perpendicular to the longitudinal axis.

In the same way as FIG. 8, FIG. 10 shows diagrammatically a disk-shaped strut element 3a in a hollow body 2 in a cross-section perpendicular to the longitudinal axis of the hollow body 2, said strut element having cutouts near the center of the sides of the cross-section of the hollow body 2. The strut element 3a shown extends over the majority of the cross-section of the hollow body 2. It is also possible to provide no cutouts or alternatively to provide the cutouts at other points of the disk-shaped strut element 3a, wherein cutouts must not be placed at the corners, and hence at the edges of the construction element 1.

Figure 11:
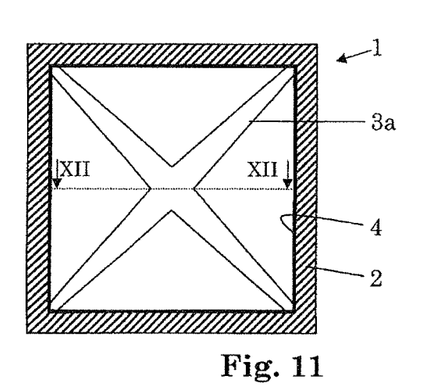
FIG. 11 shows diagrammatically a construction element with a cross-shaped strut element in a cross-section perpendicular to the longitudinal axis.
Figure 12:
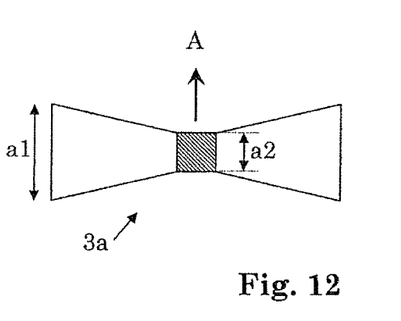
FIG. 12 shows diagrammatically in plan view the cross-shaped strut element from FIG. 11 in a cross-section perpendicular to the longitudinal axis.

FIG. 11 shows diagrammatically a special cross-shaped strut element 3a in a hollow body 2 in a cross-section perpendicular to the longitudinal axis of the hollow body 2. FIG. 12 shows the strut element 3a from FIG. 11 in a cross-section perpendicular to the longitudinal axis A of the hollow body 2 along the dotted line indicated in FIG. 11 by XII.

With respect to a coordinate running parallel to the longitudinal axis A, the strut element 3a has an elongation that tapers substantially from the point of contact with the hollow body 2 towards the center of the hollow body 2 (cf FIG. 12, from length a1 to length a2). In addition, the thickness of the strut element 3a inside a cross-section perpendicular to the longitudinal axis of the hollow body 2 substantially increases from the point of contact with the hollow body 2 towards the center of the hollow body 2 (cf FIG. 11). A high degree of stability can thereby be achieved with a low cost of materials and a correspondingly low weight: the strut element 3a itself withstands high compressive forces but hardly bends and also does not tilt out of its position perpendicular to the longitudinal axis A, and moreover the compressive load in the edges of the hollow body 2 is low as it is spread over the length a1.

Figure 13:
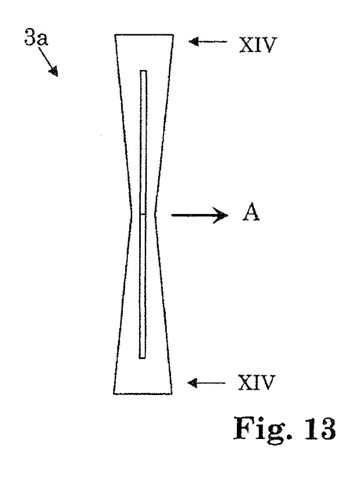
FIG. 13 shows diagrammatically a bar-like strut element in a front view perpendicular to the longitudinal axis of a construction element.
Figure 14:
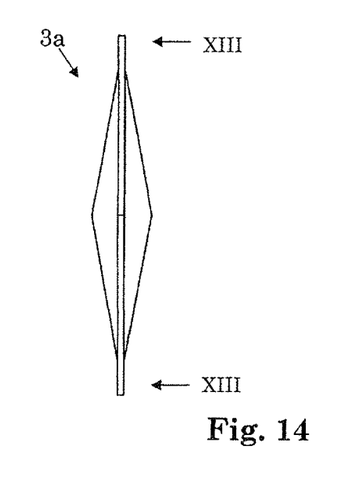
FIG. 14 shows diagrammatically the bar-like strut element from FIG. 13 in a front view parallel to the longitudinal axis of a construction element.

FIG. 13 shows diagrammatically a special bar-shaped strut element 3a in a view perpendicular to the longitudinal axis A. The longitudinal axis A furthermore relates to the scenario in which the strut element 3a is incorporated into a hollow body 2 or a semi-finished product, the longitudinal axis A being that of the semi-finished product, the hollow body 2 and hence also the construction element formed. FIG. 14 shows diagrammatically the strut element 3a from FIG. 13 in a front view parallel to the longitudinal axis A. The arrows indicated by XIV and XIII each give the view in which the respective other figure is shown.

What applies to the strut element 3a in FIGS. 11, 12 also applies to the strut element 3a in FIGS. 13, 14: With respect to a coordinate running parallel to the longitudinal axis A, the strut element 3a has an elongation that tapers substantially from the point of contact with the hollow body 2 towards the center of the hollow body 2 (cf FIG. 13). In addition, the thickness of the strut element 3a inside a cross-section perpendicular to the longitudinal axis of the hollow body 2 substantially increases from the point of contact with the hollow body 2 towards the center of the hollow body 2 (cf FIG. 14). Correspondingly, a high degree of stability with a low weight is achieved with such a bar-like strut element 3a too.

As is the case for the strut elements 3a, 3b described in FIGS. 1 and 2, the shape of the strut elements 3a described in FIGS. 8 to 14 can be matched to the shape of the hollow body 2 at the points which come into contact with the hollow body and interact. Strut elements 3a and possibly 3b with rounded ends are thus suitable for internally rounded edges of the hollow body, and strut elements 3a and possibly 3b with a correspondingly rectangular profile are suitable for internally rectangular edges of the hollow body. This also applies to the strut elements described below.

Figure 15:
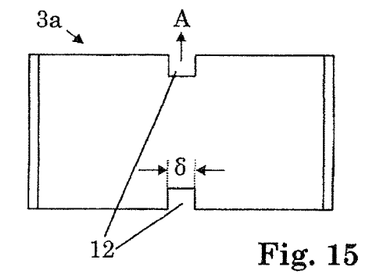
FIG. 15 shows in plan view a strut element for forming a chain of strut elements that engage with one another.
Figure 16:
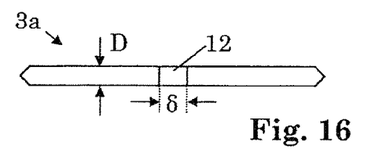
FIG. 16 shows the strut element from FIG. 15 in a front view along the longitudinal axis.

FIG. 15 shows in plan view a strut element 3a for forming a chain of strut elements which engage with one another. FIG. 16 shows the strut element 3a from FIG. 15 in a view along the longitudinal axis A. The strut element 3a is substantially cuboid or plate-shaped, has edges which are integrally formed on the inner edges of a hollow body in which the strut element is to be used, and has two grooves 12, wherein the strut element 3a can engage at each of the two grooves 12 with a further strut element which typically has the same design, so that the grooves engage with one another. A strut element 3a according to FIGS. 15, 16 can also have cutouts, as a result of which a relatively large amount of material and hence weight can be saved with a relatively low loss of stability.

Figure 17:
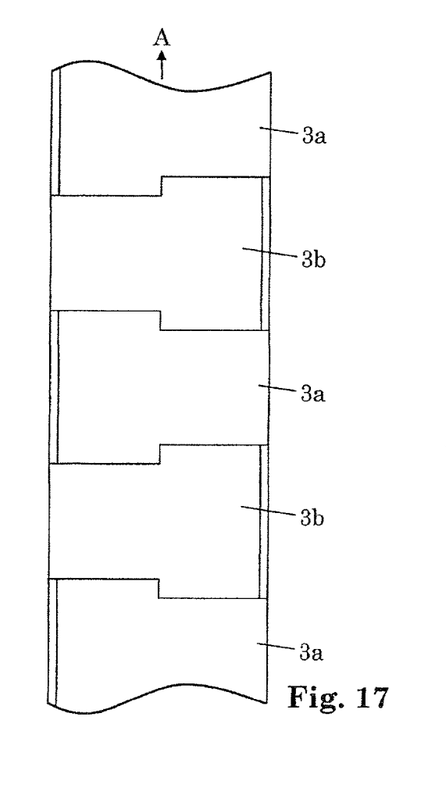
FIG. 17 shows in plan view a chain of strut elements that engage with one another according to FIGS. 15 and 16.

FIG. 17 shows in plan view a chain of mutually engaging strut elements according to FIGS. 15 and 16 which is produced in such a way.

At the grooves 12, a degree of play can be provided which permits one strut element 3a to move relative to a strut element 3b engaging with it, and vice versa. Such play is the result of the difference of the gap width 6 of the groove 12 less the thickness D of the strut element and is typically 0.05 to 3 mm.

Adjacent engaging strut elements are thereby at least largely decoupled in terms of their respective absorption of compressive forces, but bending of the strut element 3a (in a direction perpendicular to the longitudinal axis A) is impeded or limited to a maximum bend that can be specified (by said play).

An increased degree of stability with low weight is achieved by the engagement in the grooves 12. As can be seen from the example according to FIGS. 15 to 17, the same parts can be used as the strut elements 3a and 3b.

Figure 18:
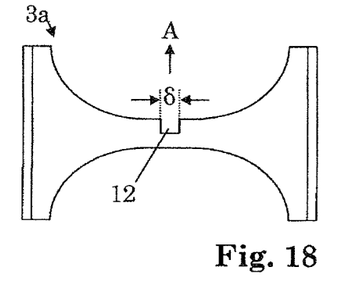
FIG. 18 shows in plan view a strut element for forming a pair of strut elements that engage with one another.
Figure 19:
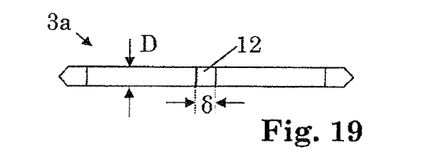
FIG. 19 shows the strut element from FIG. 18 in a front view along the longitudinal axis.

FIG. 18 shows in plan view a strut element 3a for forming a pair of engaging strut elements. FIG. 19 shows the strut element 3a from FIG. 18 in a view along the longitudinal axis A. The strut element 3a is substantially plate-shaped, wherein in plan view it substantially tapers between the edges towards the center. The edges are integrally formed on the inner edges of a hollow body in which the strut element is to be used. The strut element 3a has a groove 12 at which it can engage with a further strut element which typically has the same design, so that the grooves engage with one another.

The same applies to the effect of the grooves 12 and the play as for the embodiment according to FIGS. 15 to 17.

Analogously to the embodiment according to FIGS. 18 and 19, it is also possible in the embodiment according to FIGS. 15 to 17 to provide just one groove 12 per strut element and only to form pairs of strut elements instead of long chains. In this case, increased stability (in particular flexural rigidity) can, for example, be achieved by the groove being extended further into the strut element, for example approximately as far as its center.

Figure 20:
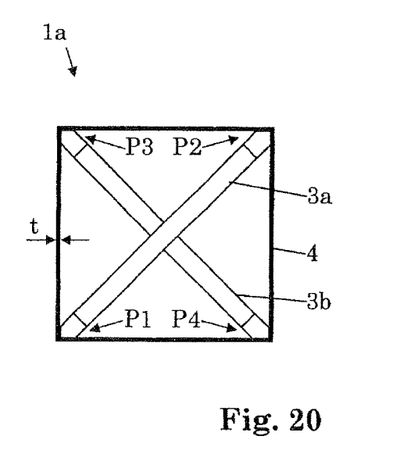
FIG. 20 shows a semi-finished product with pairs of strut elements according to FIGS. 18, 19 in a front view along the longitudinal axis.

FIG. 20 shows a semi-finished product 1a with pairs of strut elements from FIGS. 18, 19 in a view along the longitudinal axis A. The sleeve element 4 surrounds the strut elements 3a, 3b in such a way that, when the semi-finished product 1a for forming a construction element is arranged in a hollow body, the strut elements cannot become stuck to the hollow body. It is acceptable for strut elements to adhere to the hollow body (of course via the sleeve element) at just one end of the strut element, and for just slight adhesion where necessary at both ends. Strong adhesion at both ends is, however, to be avoided.

When a semi-finished product 1a is surrounded with a fibrous material during the production of a construction element or a surface element or during the virtually simultaneous production of construction and surface elements, as was described in conjunction with FIG. 7, a particularly high loading capacity can be obtained for the created element by selecting a suitable orientation or orientation distribution of the fibers of the fibrous material. Paper-like fibrous material can, for example, be used, in other words fibrous material which has fibers that are oriented non-uniformly, or fibrous material whose fibers enclose an angle of approximately 45° with the longitudinal axis.

In the case of surface elements which are to be used in a substantially horizontal orientation and thus, for example, as floor or ceiling elements or otherwise as load-bearing plates, improved stability can be achieved by providing that the majority of the fibers of the surface element, in particular 80% of the fibers, enclose an angle of approximately 45° with the longitudinal axis.

In the case of surface elements which are to be used in a substantially horizontal orientation and thus, for example, as floor or ceiling elements or otherwise as load-bearing plates, improved stability can be achieved by providing that the majority of the fibers of the surface element, in particular 80% of the fibers, are oriented either substantially parallel or essentially perpendicularly to the longitudinal axis, preferably substantially half parallel and half perpendicular. The individual construction elements can, for example, be wrapped with fibrous mats in which the majority of or virtually all the fibers are oriented within ±10° parallel to the longitudinal axis, and, in order to form a cover element, fibrous mats are then arranged on top, the majority of or virtually all the fibers of the fibrous mats being oriented within ±10° perpendicular to the longitudinal axis.

Figure 21:
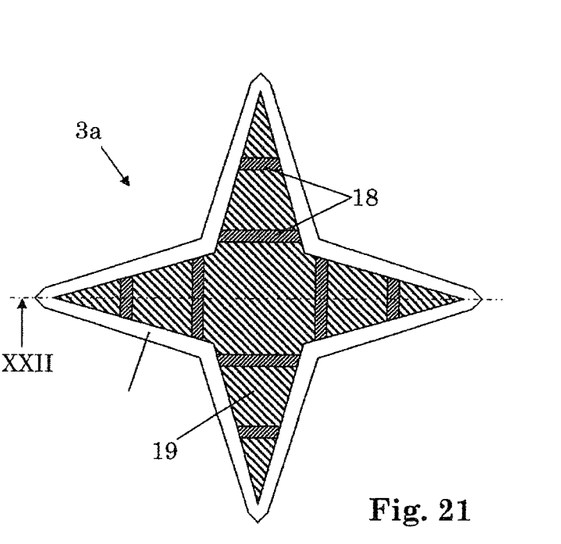
FIG. 21 shows a star-shaped strut element reinforced with braces in a front view along the longitudinal axis.
Figure 22:
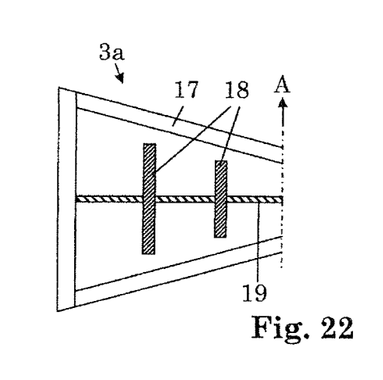
FIG. 22 shows a view of a detailed cross-section of the strut element from FIG. 21 along the line labeled XXII in FIG. 21.

FIG. 21 shows a star-shaped strut element 3a reinforced with braces in a front view along the longitudinal axis A. FIG. 22 shows a view of a detailed cross-section of the strut element from FIG. 21 along the line labeled XXII in FIG. 21. The strut element 3a has a frame 17 which is integrally formed on a flat star element 19 and the star element 19 is reinforced by braces 18. The strut element 3a is particularly rigid and can absorb high compressive forces and is thus very light (low cost of materials).

Figure 23:
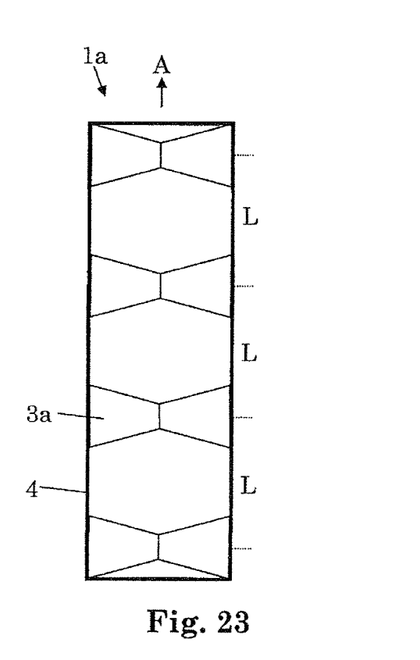
FIG. 23 shows a semi-finished product with spaced-apart strut elements from FIGS. 21, 22 in a plan view perpendicular to the longitudinal axis.

FIG. 23 shows diagrammatically a semi-finished product 1a with spaced-apart strut elements from FIGS. 21, 22 in a plan view perpendicular to the longitudinal axis A. It is also possible to place the strut elements directly next to one another in rows.

Figure 24:
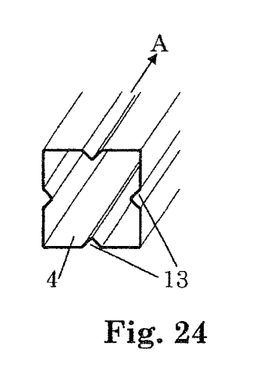
FIG. 24 shows diagrammatically a sleeve element with corrugations.
Figure 25:
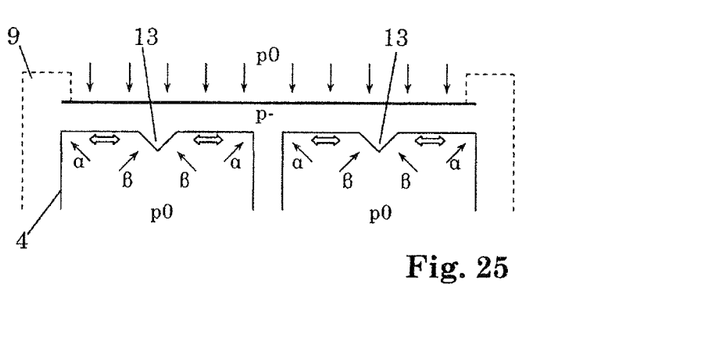
FIG. 25 shows an illustration of the effect of corrugations in a sleeve element.

FIG. 24 shows a sleeve element 4 with corrugations 13. Such corrugations 13 are useful but not essential, in particular when such production processes as were explained in conjunction with FIG. 7 are used. FIG. 25 serves to explain the connections.

FIG. 25 is an illustration of the effect of corrugations 13 in a sleeve element 4. Strut elements are not shown in FIG. 25. The container 9 is only shown diagrammatically. Forces which pull the sleeve elements 4 away from the ends of the strut elements result from the generation of a reduced pressure p− outside the sleeve elements 4 with a higher pressure p0 (for example, ambient pressure) inside the sleeve elements 4. The sleeve elements 4 are stretched outwards at the edges. The arrows labeled a symbolize these forces. If these forces are not counteracted, it can be expected that the strut elements are not retained in the sleeve element 4 and hollow body 2 and compressive forces acting on the hollow body are absorbed by the strut elements only when they are very high and have correspondingly already caused major deformations of the hollow body. It is moreover also possible, in the case of spaced-apart strut elements, that they change their position (along the longitudinal axis) inside the sleeve element 4 and thus inside the hollow body.

The provision of the corrugations 13 can ensure that forces occur which counteract the forces labeled α and can prevent the occurrence of the consequences described. These forces are symbolized by the arrows labeled β. Close to the corrugations 13, forces occur which tend to cause a reduction in the width of the corrugation. This in turn causes the material of the sleeve element 13 to be pulled away from the edges in the direction of the corrugation 13. The open arrows symbolize the opposing tendencies which are caused by the forces α and β. As a result of a suitable matching of the dimensions of the corrugation 13 to the dimensions of the sleeve element and the pressures p0, p− used, it can be achieved that in a surface element produced in this way there is a suitable contact between the strut elements and the hollow body (via the sleeve element).

Semi-finished products on the basis of which construction elements 1 or surface elements 5 are created do not necessarily have to have a sleeve element 4, seen from a general point of view. This has already been indicated above. Formulated more generally, a semi-finished product 1a has a longitudinal axis A and four edges (preferably substantially continuous edges) of a cuboid which run parallel to the longitudinal axis L are formed by the semi-finished product 1a. The semi-finished product 1a also has at least one first 3a and at least one second 3b strut element, as well as at least one retaining element. The at least one retaining element can, for example, have or be a sleeve element 4 and/or a plurality of connecting elements 20 (cf FIG. 26). The strut elements 3a, 3b are connected to each other by the at least one retaining element. The first strut element 3a extends from a first point P1 at a first edge of the cuboid to a second point P2 at a second edge of the cuboid, and the second strut element 3b extends from a third point P3 at a third edge of the cuboid to a fourth point P4 at a fourth edge of the cuboid. A suitable and stable base for the simple creation of construction elements can be provided by the at least one retaining element, and the strut elements can be retained in their position relative to each other.

Figure 26:
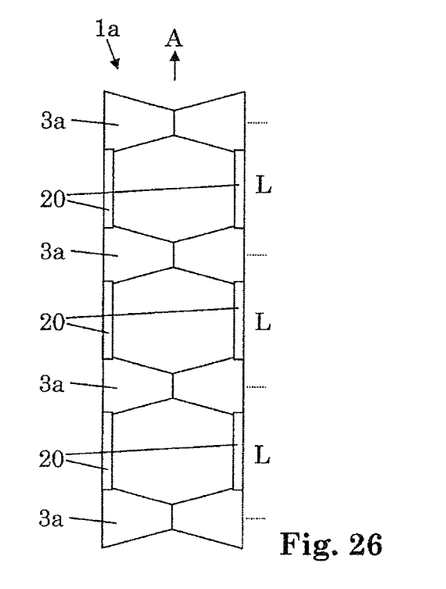
FIG. 26 shows a semi-finished product with strut elements from FIGS. 21, 22 which are interconnected by connecting elements in a plan view perpendicular to the longitudinal axis.

FIG. 26 shows a semi-finished product 1a with strut elements 3a, from FIGS. 21, 22 which are interconnected by connecting elements 20 in a plan view perpendicular to the longitudinal axis A. The connecting elements 20 are arranged at the edges of the cuboid, are designed as bars and are oriented substantially parallel to the longitudinal axis A. The connection between the connecting elements 20 and strut elements 3a can be a form-fitting one and, for example, take the form of a snap-fit connection. It is possible to provide relatively long connecting elements 20 which extend, for example, substantially along the total length of the semi-finished product (along the longitudinal axis A) so that only four connecting elements 20 per semi-finished product 1a are required (one per edge of the cuboid).

Figure 27:
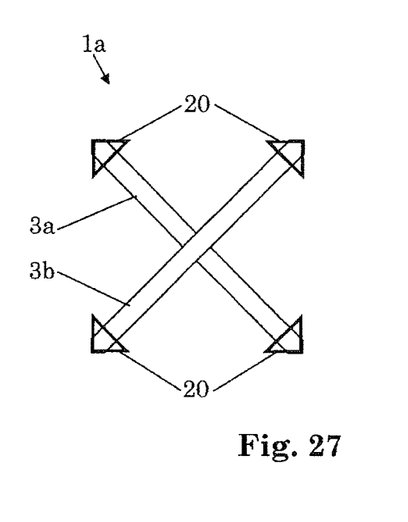
FIG. 27 shows a semi-finished product with strut elements which are interconnected by connecting elements in a cross-sectional view along the longitudinal axis.

FIG. 27 shows a semi-finished product 1a with substantially bar-shaped strut elements 3a, 3b which are interconnected by connecting elements 20 in a cross-sectional view along the longitudinal axis A. The connecting elements 20 are hollow in design with a triangular cross-section and connect respectively adjacent first connecting elements 3a and respectively adjacent second connecting elements 3b. At least one other connection between first and second strut elements should be provided to stabilize the semi-finished product 1a (not shown in FIG. 27).

It can be provided that after a construction element or a surface element has been created based on a semi-finished product 1a, the at least one retaining element remains in the construction or surface element created, in particular that the connecting elements 20 (all or the majority of the connecting elements 20) remain, in the construction or surface element created; but it can also alternatively be provided that the at least one retaining element, in particular the connecting elements 20 (all or the majority of the connecting elements 20) are removed again from the construction or surface element created.

A support member and its creation are explained with reference to FIGS. 28 and 29.

Figure 28:
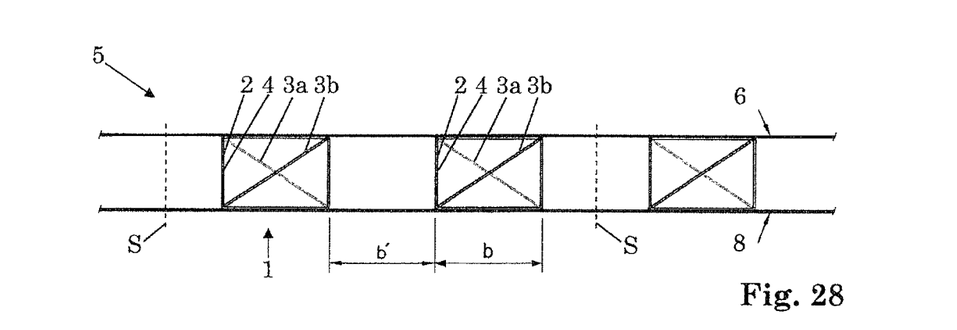
FIG. 28 shows a surface element with spaced-apart construction elements in a cross-section perpendicular to the longitudinal axis of the construction elements.

In the same way as FIG. 3, FIG. 28 shows a surface element 5 in a cross-section perpendicular to the longitudinal axis A of the construction elements 1. The surface element 5 has spaced-apart construction elements 1. Instead of allowing the construction elements 1 to adjoin one another directly, they can also be arranged spaced apart (spacing b'). Spacers can, for example, be arranged between the construction elements 1 and may optionally be removed again later. Hollow bodies which correspond to the hollow bodies 2 of the construction elements 1 or differ from these can, for example, be arranged in each case between adjacent construction elements 1.

A surface element 5 according to FIG. 28 can be used as a preliminary stage for creating a support member 21.

Figure 29:
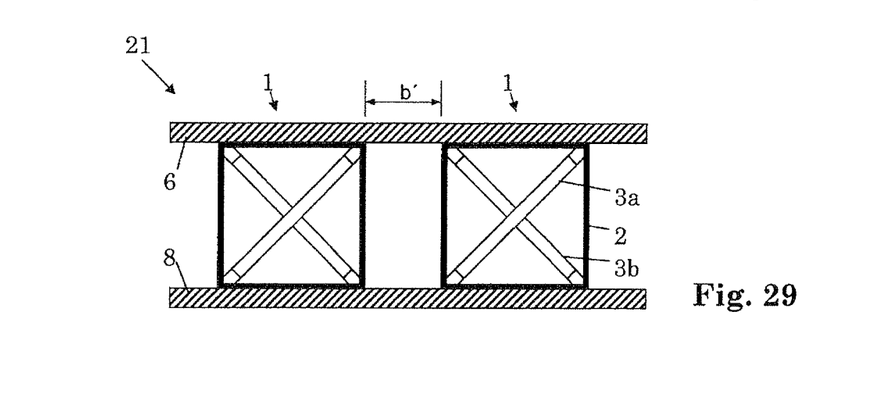
FIG. 29 shows a support member in a cross-section perpendicular to the longitudinal axis of the construction elements.

FIG. 29 shows a support member 21 in a cross-section perpendicular to the longitudinal axis of the construction elements 1. To create the support member 21, a surface element 5 similar to that shown in FIG. 28 is separated parallel to the longitudinal axis at the lines of section labeled S. The distance of the line of section S from the nearest construction element 1 can also be larger or smaller than b'/2. Such a support member 21 can be used in many different ways as a bending beam.

Typical dimensions which are currently estimated as being particularly suitable for such support members 21 are: length (parallel to the longitudinal axis A) 1 m to 40 m; width (perpendicular to the longitudinal axis A) 20 cm to 1 m or up to 4 m or wider; height (perpendicular to the longitudinal axis A) 10 cm to 60 cm or up to 4 m or higher.

FIG. 29 is moreover an example for construction and surface elements which do not have a sleeve element 4 separate from the hollow body 2.

In the case of strut elements which interact only with two edges of the hollow body (cf FIGS. 1 to 4, 8, 13 to 20, 27), it can be provided that they are arranged in alternating fashion along one and the other diagonal of the hollow body, wherein they can adjoin one another or can be spaced apart from one another along the longitudinal axis (cf FIGS. 2 and 23). Alternatively, it is also possible that each of two such strut elements are arranged so that they engage with each other and overlap with respect to their position relative to the longitudinal axis (cf FIG. 17) or are substantially identically positioned relative to it (cf the strut elements from FIGS. 18 to 20). Such engaging strut elements can form pairs (cf the strut elements from FIGS. 18 to 20) which in turn can adjoin one another or can be spaced apart from one another along the longitudinal axis, or they form one or more chains of engaging strut elements (cf FIG. 17).

So that the construction elements and surface elements can absorb high compressive forces, the strut elements have a high flexural rigidity. Such flexural rigidity can be significantly affected not only by the choice of materials but also by the geometric design of the strut elements (cf FIGS. 11 to 14 and 21, 22), as well as by the mutual interaction of strut elements, as in the case of engaging strut elements (cf FIGS. 17, 20).

By means of the invention, extremely light and nevertheless stable elongated or flat construction elements can be provided which can be used in many different ways. The self-contained static system can be compared in terms of its load bearing with a three-dimensional building framework but manages without the node points of a building framework as the strut elements do not need to meet at a point.

LIST OF REFERENCE SYMBOLS 1 construction element
1a semi-finished product
2 hollow body
3a, 3b strut elements
4 sleeve element
5 surface element
6 cover element
7 filling material
8 cover element
9 container
10 fastening means, toothed element
11 fastening means, connecting element
12 groove
13 corrugation
14 fibrous material
15 boundary
16 boundary
17 frame
18 brace
19 star element
20 connecting element, stabilizing element
21 support member, bending beam
a1, a2 lengths
A longitudinal axis
b width
b' width
d wall thickness
D diameter
h height
L spacing
p0 pressure
p− pressure
P1, P2, P3, P4 points
S line of section
t wall thickness
δ groove width

The invention claimed is:

1. A semi-finished product (1a) having a tubular sleeve element (4) which extends along a longitudinal axis (A) and at least a first (3a) and at least a second (3b) strut element arranged inside the sleeve element (4) with the strut elements disposed spaced apart from one another in direction of the longitudinal axis or disposed one behind the other in direction of the longitudinal axis and may overlap one another, wherein the first strut element (3a) extends from a first point (P1) to a second point (P2), and the second strut element (3b) extends from a third point (P3) to a fourth point (P4), wherein said points (P1, P2, P3, P4) considered in a plane perpendicular to the longitudinal axis (A) form four corner points of a rectangle, wherein the first (P1) and the second (P2) points form corner points of the rectangle which are opposite each other relative to the longitudinal axis (A), wherein the strut elements (3a, 3b) are designed in such a way and arranged inside the sleeve element (4) in such a way that essentially no tensile forces can be exerted on the strut elements (3a, 3b) by the sleeve element (4), by means of the strut elements (3a, 3b) are not fastened to the sleeve element (4) and do not adhere to the sleeve element (4).

2. The semi-finished product (1a) as claimed in claim 1, wherein the strut elements (3a, 3b) are designed in such a way and arranged inside the sleeve element (4) in such a way that compressive forces can be exerted on the strut elements (3a, 3b) by the sleeve element (4).

3. The semi-finished product (1a) as claimed in claim 1, wherein the first (P1) and the second (P2) point lie in one and the same plane perpendicular to the longitudinal axis (A), and in that the third (P3) and the fourth (P4) point lie in one and the same plane perpendicular to the longitudinal axis (A).

4. The semi-finished product (1a) as claimed in claim 1, wherein the strut elements (3a, 3b) are each oriented substantially perpendicular to the longitudinal axis (A).

5. The semi-finished product (1a) as claimed in claim 1, wherein the sleeve element (4) is substantially a film.

6. The semi-finished product (1a) as claimed in claim 1, wherein the sleeve element (4) has, in at least one surface formed by the sleeve element (4) and which contains said points (P1, P2, P3, P4), a corrugation (13) which runs substantially parallel to the longitudinal axis (A).

7. The semi-finished product (1a) as claimed in claim 1, wherein the first strut element (3a) and the second strut element (3b) are designed such that they engage with each other in such a way that each strut element (3a; 3b) impedes or prevents the respective other strut element from bending.

8. The semi-finished product (1a) as claimed in claim 1, wherein the strut elements (3a, 3b) are substantially fabricated from a material selected from the group consisting of ceramic, concrete, plastic, and fiber-reinforced plastic.

9. A construction element (1) comprising a semi-finished product (1a) having a tubular sleeve element (4) which extends along a longitudinal axis (A) and at least a first (3a) and at least a second (3b) strut element arranged inside the sleeve element (4), with the strut elements (3a, 3b) disposed spaced apart from one another in direction of the longitudinal axis (A) or disposed one behind the other in direction of the longitudinal axis (A) and may overlap one another, wherein the first strut element (3a) extends from a first point (P1) to a second point (P2), and the second strut element (3b) extends from a third point (P3) to a fourth point (P4), wherein said points (P1, P2, P3, P4) considered in a plane perpendicular to the longitudinal axis (A) form four corner points of a rectangle, wherein the first (P1) and the second (P2) points form corner points of the rectangle which are opposite each other relative to the longitudinal axis (A), wherein the strut elements (3a, 3b) are designed in such a way that essentially no tensile forces can be exerted on the strut elements (3a, 3b) by the sleeve element (4), by means of the strut elements (3a, 3b)

are not fastened to the sleeve element (4) and do not adhere to the sleeve element (4), wherein the sleeve element (4) forms a hollow body (2) which extends along the longitudinal axis (A) and has a substantially rectangular cross-section with rounded corners.

10. The construction element (1) as claimed in claim 9, wherein the hollow body (2) is fabricated substantially from a fiber-reinforced plastic.

11. The construction element (1) as claimed in claim 10, wherein the majority of the fibers of the fiber-reinforced plastic form an angle of 45°±25° with the longitudinal axis (A).

12. A surface element (5) having a plurality of construction elements (1) comprising a semi-finished product (1*a*) having a tubular sleeve element (4) which extends along a longitudinal axis (A) and at least a first (3*a*) and at least a second (3*b*) strut element arranged inside the sleeve element (4), with the strut elements (3*a*, 3*b*) disposed spaced apart from one another in direction of the longitudinal axis (A) or disposed one behind the other in direction of the longitudinal axis (A) and may overlap one another, wherein the first strut element (3*a*) extends from a first point (P1) to a second point (P2), and the second strut element (3*b*) extends from a third point (P3) to a fourth point (P4), wherein said points (P1, P2, P3, P4) considered in a plane perpendicular to the longitudinal axis (A) form four corner points of a rectangle, wherein the first (P1) and the second (P2) points form corner points of the rectangle which are opposite each other relative to the longitudinal axis (A), wherein the strut elements (3*a*, 3*b*) are designed in such a way and arranged inside the sleeve element (4) in such a way that essentially no tensile forces can be exerted on the strut elements (3*a*, 3*b*) by the sleeve element (4), by means of the strut elements (3*a*, 3*b*) are not fastened to the sleeve element (4) and do not adhere to the sleeve element (4), wherein the sleeve element (4) forms a hollow body (2) which extends along the longitudinal axis (A) and has a substantially rectangular cross-section with rounded corners, wherein the construction elements are arranged next to one another and fastened relative to one another.

13. The surface element (5) as claimed in claim 12, further comprising a cover element (6) arranged above or below the construction elements (1).

14. The surface element (5) as claimed in claim 12 or claim 13, comprising two construction elements (1) which are arranged spaced apart from each other perpendicular to the longitudinal axis (A), without a further construction element (1) being arranged between them.

15. A method for producing a surface element (5), comprising the steps of:
providing a plurality of semi-finished products (1*a*) in each by means of which four edges of a cuboid running parallel to a longitudinal axis (L) are formed and which has at least a first (3*a*) and at least a second (3*b*) strut element, the first strut element (3*a*) extending from a first point (P1) on a first edge of the cuboid to a second point (P2) on a second edge of the cuboid and the second strut element (3*b*) extending from a third point (P3) on a third edge of the cuboid to a fourth point (P4) on a fourth edge of the cuboid, with the strut elements (3*a*, 3*b*) disposed spaced apart from one another in direction of the longitudinal axis (A) or disposed one behind the other in direction of the longitudinal axis (A) and may overlap one another, and wherein the strut elements (3*a*, 3*b*) are designed in such a way and arranged inside the sleeve element (4) in such a way that essentially no tensile forces can be exerted on the strut elements (3*a*, 3*b*) by the sleeve element (4), by means of the strut elements (3*a*, 3*b*) are not fastened to the sleeve element 94) and do not adhere to the sleeve element (4), is surrounded with a fibrous material (14), arranging a plurality of the semi-finished products (1*a*) surrounded with fibrous material (14) next to one another, introducing a filling material (7) into the fibrous material (14) and hardening the filling material.

16. The method as claimed in claim 15, comprising generating a reduced pressure on the fibrous material (14) in order to introduce the filling material (7) into the fibrous material (14).

17. The method as claimed in claim 16, comprising arranging at least one section of the semi-finished products (1*a*) surrounded by fibrous material (14) between two boundaries (15, 16) and generating the reduced pressure (p−) between the boundaries (15, 16), while a higher pressure (p0) prevails beyond at least one of the boundaries (15, 16) and inside the semi-finished products (1*a*).

18. A construction element (1) comprising a semi-finished product (1*a*) having a tubular sleeve element (4) which extends along a longitudinal axis (A) and at least a first (3*a*) and at least a second (3*b*) strut element arranged inside the sleeve element (4), with the strut elements (3*a*, 3*b*) disposed spaced apart from one another in direction of the longitudinal axis (A) or disposed one behind the other in direction of the longitudinal axis (A) and may overlap one another, wherein the first strut element (3*a*) extends from a first point (P1) to a second point (P2), and the second strut element (3*b*) extends from a third point (P3) to a fourth point (P4), wherein said points (P1, P2, P3, P4) considered in a plane perpendicular to the longitudinal axis (A) form four corner points of a rectangle, wherein the first (P1) and the second (P2) points form corner points of the rectangle which are opposite each other relative to the longitudinal axis (A), wherein the strut elements (3*a*, 3*b*) are designed in such a way and arranged inside the sleeve element (4) in such a way that essentially no tensile forces can be exerted on the strut elements (3*a*, 3*b*) by the sleeve element (4), by means of the strut elements (3*a*, 3*b*) are not fastened to the sleeve element (4) and do not adhere to the sleeve element (4), wherein the sleeve element (4) is arranged inside a hollow body (2) which extends along the longitudinal axis (A) and has a substantially rectangular cross-section with rounded corners.

19. The construction element (1) as claimed in claim 18, wherein the hollow body (2) is fabricated substantially from a fiber-reinforced plastic.

20. The construction element (1) as claimed in claim 19, wherein a majority of the fibers of the fiber-reinforced plastic form an angle of 45°±25° with the longitudinal axis (A).

* * * * *